June 30, 1959 S. H. FLOWER ET AL 2,892,339
BUILDING UNITS
Filed Jan. 30, 1953 5 Sheets-Sheet 1

Inventors
S. H. Flower
J. Parsons
N. Greenlees
W. Loudon
By Glascock Downing Tuttle
Attys.

June 30, 1959  S. H. FLOWER ET AL  2,892,339
BUILDING UNITS
Filed Jan. 30, 1953  5 Sheets-Sheet 3

Inventors
S. H. Flower
J. Parsons
N. Greenlees
W. Loudon

United States Patent Office 2,892,339
Patented June 30, 1959

2,892,339

BUILDING UNITS

Stanley Howard Flower, John Parsons, and Norman Greenlees Weir Loudon, Chertsey, England, assignors to Bellrock Gypsum Industries Limited, Chertsey, England Application January 30, 1953, Serial No. 334,116

Claims priority, application Great Britain February 4, 1952

6 Claims. (Cl. 72—41)

This invention relates to prefabricated building units, panels or slabs (hereinafter called panels) of gypsum plaster or other moldable composition (hereinafter called plaster) of the type comprising a molded facing sheet on both sides and cell-forming walls extending between the facings, the cells (such as of hexagonal form) being disposed with their axes at right-angles to the facing or facings.

The invention is also directed to the provision of an improved panel characterised by having a pair of facings one of which is integral and homogeneous with the cell-forming walling and the other is strongly secured to said walling by means additional to any adhesion of the plaster in the form of a mechanical bond or keying formation.

Therefore, the invention has for an object to provide a prefabricated gypsum plaster panel member to be utilized for building purposes and which panel member comprises a continuous facing sheet of gypsum plaster forming one side of the panel, laterally interconnected gypsum plaster walls extending outwards from one side of that facing sheet and being both integral and homogeneous with the plaster of the facing sheet, the walls defining a group of separate cells having their central longitudinal axes at right angles to the facing sheet and the cells terminating in end surfaces on a substantially common level in a plane parallel to the sheet. The inner surfaces of the walls of the cells having deformations therein defining at least one pair of surfaces that extend transversely of the axes of the cells and which lie on substantially common levels inwards of the ends of the cells. The transversely extending surfaces have a substantial extent in a direction around the interior of each cell in relation to the perimetrical extent of each cell, and to complete the panel a second continuous gypsum plaster facing sheet covers the ends of all the cells and has a thickness to extend inwardly of each cell toward the first facing sheet a distance such as to extend beyond the transversely extending surfaces, whereby the second facing sheet is both integrally bonded to and mechanically interconnected with the walls defining the cells.

The panel is preferably manufactured by apparatus comprising a facing-mold table for containing a body of plaster having displaceable side walls or flaps, a series of rubber or like deformable plugs for molding cell walling in one with a facing layer of plaster, a vertically movable framing or support(s) on which the plugs are mounted in spaced relation, means for immersing the plugs in plaster of the facing-mold to form the whole of the cell walling for a panel simultaneously with the facing, and means for contracting the plugs for their withdrawal from the molded plaster after it has set.

Each plug is hollow and of appropriate form in plan for the molding of the interior of a cell of chosen shape, which for economic reasons is preferably hexagonal (or a component of a hexagon) such that the molded cells lie in relation to one another in honeycomb pattern. The plugs may be prisms; it is, however, preferred that the walls thereof should taper externally from the base, or in other words the plug is a steep frustum or a truncated pyramid having an apertured base and a truncation surface parallel to the base, the base corners of other selected part such as the truncation surface, preferably being more readily deformable than the plug walling. Although other cross-sectional shapes, such as rectangular, triangular, polygonal, circular or oval, may be employed for the cells and plugs, the invention will hereinafter be more particularly described with reference to a basically hexagonal form.

The deformation of each plug for facilitating their extraction or release from the plaster, is effected by the inward retraction of the section of the plug walling preferably by decreasing the internal hydraulic (i.e. gaseous or liquid) pressure exerted within the hollow plug.

According to one mode, contraction of the plugs is effected by placing the hollow interior of each plug in communication wtih a source of vacuum such that the walls or facets of the plug are retracted or rendered concave such as to create clearance between the plug walling and the molded cell walling.

In order to support the plug facets during the molding process against the pressure of the plaster, and also to render the truncation surface convex to ensure the expulsion of air from beneath the truncation region during molding, gas, air or liquid is preferably introduced at a suitable pressure into the plug before or as the plug is immersed in the plaster, the pressure being thereafter released.

A further feature of the deformable plugs lies in the provision on several or each of the plug facets of a groove(s) or rib(s) which is disposed in a plane(s) at right-angles or transversely to the plug axis and which preferably dies out at the corners of the figure. This grooving is so spaced axially of the plug such that the outer ends or rims of the cell walling is molded with a counterpart ribbing which is adapted to constitute a mechanical key securing the embedded ends or rims of the cells to a second facing, in addition to any union effected by the conjunction of the plaster. Thus, the inner surfaces of the walls of the cells have deformations therein defining at least one pair of surfaces extending transversely of the axes of the respective cells and in which surfaces lie on substantially common levels inwards of the end surfaces of the cells.

For use in molding the second facing of the rims of the cell walling by inverting the first formed element and immersing the ends of the cells in plaster, a second facing-mold or table is provided. This mold is similar to the first mold but the displaceable side walls or flaps are of such depth as to mold the margins of the second facing and preferably overlap to a certain extent and enclose the side walls of the first mold.

Means are provided for releasing air which would otherwise be trapped by the plaster of the second facing in the cells and such means preferably comprise vertically extending projections on certain of the plug facets in selected positions to mold notches or apertures in the cell walling (in the first molding operation) which afford free air communication between cell and cell. Lateral holes are also molded at suitable positions in the peripheral sides of the first element for the exit of air from the cells to atmosphere during the molding of the second facing. These escape holes are preferably made by introducing removable horizontal pins in the displaceable flaps of the first mold which projects across the space between said sides and the adjacent plugs.

In the accompanying drawings which illustrate a suitable mode of carrying the invention into effect:

Figure 13 is a transverse section taken on the line 13—13 of Figure 11 but with plaster shown in position.

Figures 15 and 16 are sectional views illustrating the molding of a second facing to the cell walls of an element of which the first facing and cell walls are shown in the first facing mold inverted for the second molding operation, Figure 15 illustrating a relatively thin double faced panel while Figure 16 illustrates a similar but thicker double faced panel.

Figures 1, 2, 10:
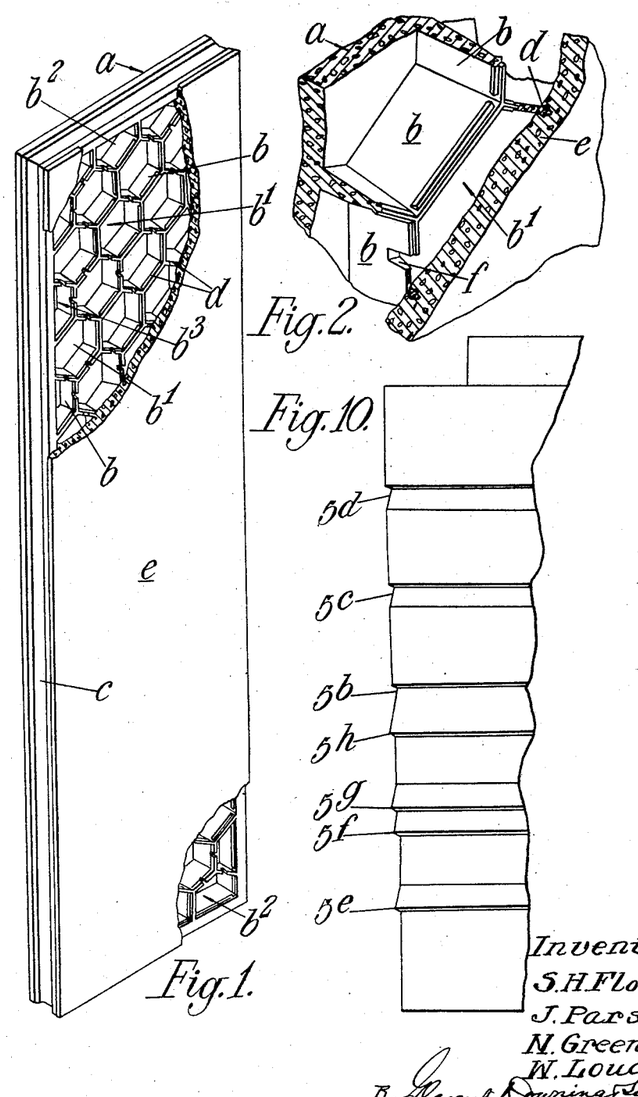
Figure 1 is an isometric view of one form of panel exemplifying the invention, in which a portion of the second facing of a double faced panel is removed to show the interior hexagonal cellular formation.
Figure 2 is an isometric enlargement of a fragment of the cell walling and facings seen in Figure 1.
Figure 10 is a fragmentary outside elevation of a standard or an axially longer form of plug suitable for molding a larger range of panels of different thicknesses in which for thinner panels the keying formations on the plug are projecting ribs while for the thicker panels the plug is provided with key-forming grooves.
Figures 3, 6:
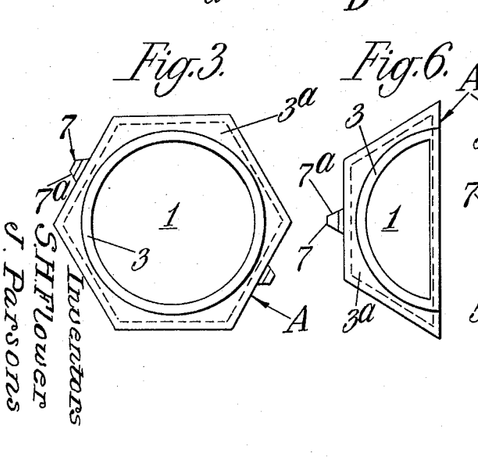
Figures 3, 4 and 5 are respectively a plan, a section and an outside elevation of a hexagonal rubber cell-forming plug with key forming grooves, employed for carrying the invention into effect.
Figures 6, 7 and 8 are respectively a plan, an outside elevation and a sectional elevation of a half hexagonal plug for molding certain of the cells at the side of a panel.
Figures 7, 8, 9:
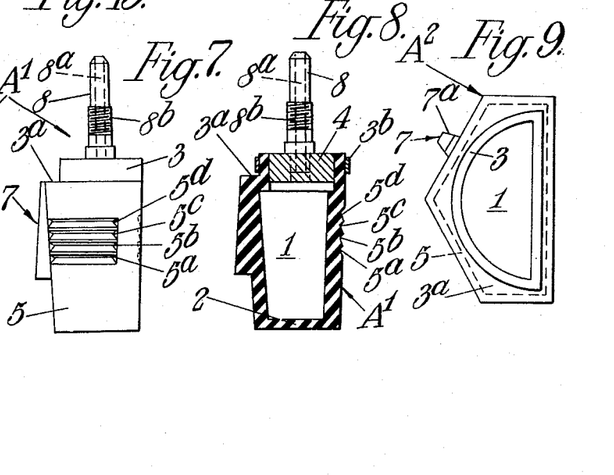
Figure 9 is a plan view of a fragmentary cell suitable for use in molding the end cells of certain panels.
Figures 13, 16:
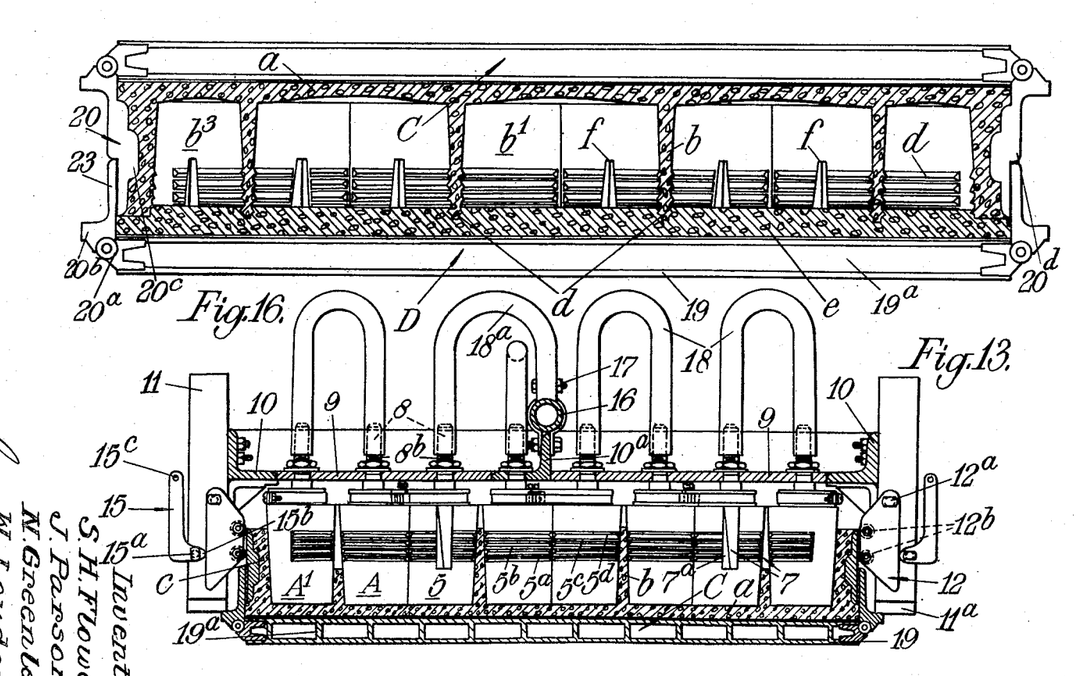

Describing in detail an example of a panel made according to the invention (see Figures 1 and 2 and Figures 15 and 16, in which latter figures the the panel is seen in cross-section in the molds), a facing $a$ of plaster is molded in one and simultaneously with hexagonal cell walling $b$. The cells $b^1$ of the main area of the panel are full hexagons while those $b^2$ at the ends of the panel are fragmentary hexagons formed by plugs $A^2$ such as shown in Figure 9. At the sides of the panel full hexagonal cells $b^1$ alternate with half hexagonal cells $b^3$ formed by plugs $A^1$ as seen in Figures 6, 7 and 8. The cell walling at the ends and sides of the panel merge into and are bounded by peripheral or edge walling $c$ which is molded with a recessed exterior channel. The cell walling tapers steeply from the bottom of the cells towards the rim thereof. The lateral portion of the cell walling adjacent the rim of the cells has ribbing $d$ molded thereon which is embedded in and keys and provides a mechanical bond with the plaster of a second facing $e$, so that in addition to the adhesion of the plaster, the rim of the cell walling is mechanically jointed with the plaster of said facing. In Figure 16 a thicker panel is seen in the molds than in Figure 15 and in this case there are a series of ribs $d$ on the cell walling which do not come into contact with the plaster but would come into use for successively thicker panels of the range provided for.

In certain cases as described hereinafter the keying adjacent the rims of the cells may take the form of grooves instead of ribs.

The cell walling is molded with apertures $f$ so that there is free communication between one cell and another to allow air to escape (ultimately to atmosphere) when the cell walling is being pressed into the plaster of the second facing $e$ during a second molding operation. The bottoms of the cells, that is to say the interior surface of the facing $a$ within the cell cavities are dished or slightly concave as produced in the first molding operation described hereinafter.

The plaster forming the facing $a$ and the cell walling $b$ is homogeneous throughout while the plaster of the facing $e$ may be different from the plaster used for the cell walling and this facing is secured to the cell walling by mechanically embedding and keying the cell rims in said facing.

The panels are preferably molded in lengths suitable for room height to extend from floor to ceiling and for such purpose sets may be molded in 8 ft., 9 ft. or 10 ft. lengths. If units are to be used in bonded horizontal courses the dimension will be chosen for convenient handling and erection. The width of the panels is conveniently 2 ft. although it will be obvious that panels may be made in other chosen widths, and it may be desirable to mold panels of a width equal to the full length of a wall or partition or some fraction (such as a half) of such length. Panels may also be molded which include gaps or openings for windows, doors and the like.

In carrying the invention into effect according to one mode described, by way of example, for the manufacture of gypsum plaster panel units comprising double facings with cells of regular hexagonal shape extending therebetween and keyed in one of the facings a series of rubber plugs A (Figures 3, 4 and 5) are molded for assembly in a framework having the general reference B (Figures 11, 12, 13) for use (as hereinafter described) in conjunction with a first facing-mold table C (Figure 14) for forming one facing in monolithic integrity with the cell forming walls, a second facing-mold table D (Figures 15 and 16) being provided for forming the second facing integrally on the ends of the cell walls and mechanically keyed thereto.

Each plug A for the main area of the panel unit is molded of a sufficiently pliable rubber to enable it to be deformed or distorted by suitable differences of air pressure internally applied. The shape of the plug is that of a steep frustum or truncated pyramid having a regular hexagonal base and is in cup-like form to afford a hollow interior 1, the truncation surface 2 being the bottom of the cup whilst a rim 3 thereof is flanged to receive a base closure plate 4 secured to the rubber in an airtight manner. The facet walls 5 of the plug may be made sufficiently stout to withstand the pressure of the plaster when the plug is immersed therein without the assistance of air at superatmospheric pressure introduced into the interior of the plug but it is preferred to use a slight supporting air pressure. In the region of the plane determined for the outward extremity of the cell walls, to be molded, the facets of the plug are formed with grooves $5a$ which become shallower and die out at the corners of the hexagonal form as at 6. Where a standardised plug structure is intended for molding panels of different thicknesses (i.e. with cell walling of lesser or greater axial extent), a series of grooves of the above character, such as $5b$, $5c$ and $5d$, are spaced parallel to one another so that for each thickness of panel to be molded, grooving is available at the outward margins or rims of the cells for molding the required keying ribbing thereon. While for the thicker panels several grooves, in addition to the marginal grooves, come into the molding operation in succession as the plugs become more deeply immersed in the plaster, only the ribbing near the marginal rim of the cell walling may be utilised for keying with the plaster of the second facing as hereinafter described.

The grooves are preferably of buttress tooth form as seen in the drawings or they may be of semicircular or other cross-section. The facets 5 of the pyramid are molded in one with the truncation surface 2 which may be made somewhat thinner or thicker than the facet walls of the plug. The relative dimensioning of the thickness of the facets and the truncation surface will depend on the relative areas exposed to the air pressure, as it is the intention that when air pressure is employed before or during the immersion of the plug it shall have a preferential effect on the truncation surface so as to cause it to become convex in order to drive out air which might otherwise be trapped beneath the truncation surface, when such contacts with the plaster.

Figures 4, 5, 14:
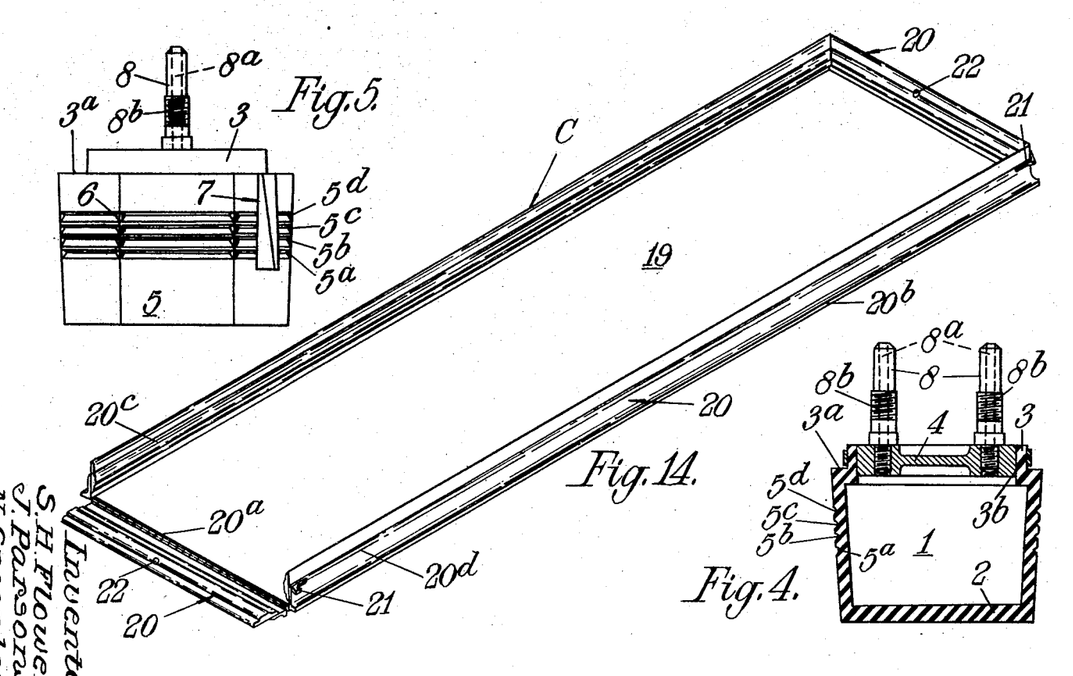
Figure 14 is an isometric view of a mold table suitable for use in molding the first facing cell-forming wall and edges or margins of a panel.

On selected facets, for example on a pair of opposite facets of the hexagon, ribs or projections 7 are molded extending axially from the base of the figure. These projections are of wedge shape both laterally and longitudinally (as seen in Figures 3 and 5), the longitudinal wedge form increasing in cross-section in the direction of the truncation due to taper of the frustum. The side 7a of the projections 7 are preferably bevelled.

According to one suitable mode of closing the base of the pyramid, it may have a shoulder 3a adjoining the neck flange 3 to receive the rim of the closure plate 4, the neck being sealed to the plate adhesively, by bonding or by pressure exerted mechanically as by a metal contractible strap 3b of known type. Alternatively, the base may be provided with a closure surface or member in any appropriate manner. Each closure is provided with a pair of rods 8, tapped into holes in the plate 4, adapted to form suspensory supports for the plugs in a framework described below. These rods are tubular having bores 8a so that they may be employed as air ducts as well as securing means, for which latter purpose they are provided with screwthreaded portions 8b but for convenience in making suspensory adjustments of the plugs in the framework, it may be preferred to provide separate air ducts which may be in the form of a pipe or pipes communicating with the plug interior through the base closure. In either case the rods or pipes serve as conduits for varying the air pressure within the plug by supplying air under pressure and for evacuating the interior of the plug.

Although it is preferred to make the cell-forming plugs of rubber, they may be formed of a synthetic composition such as neoprene or other pliable and resilient resin, and the side walling of the facing-molds may be lined with a material such as polyvinyl chloride or polythene, to prevent sticking and avoid the application of grease or the like.

The rubber or other composition of which the plugs are mainly composed may be reinforced or lined with canvas or other fabric in a manner which will not interfere with their deformation or collapsing in the described manner.

Plugs having the above characteristics are mounted in the framework described below for the main area of the units but for the sides of the units and at both ends special plugs which are half or a fragment of a hexagon are provided. For example, for the longer sides of the panel unit plugs $A^1$ (as shown in Figures 6, 7 and 8) of half hexagon shape are employed. Each of such plugs has the division taking place across the diagonal between corner and corner while the fractional plugs $A^2$ (see Figure 9) for the ends of a panel may be divided by a line at right-angles to a pair of parallel facets. These fractional plugs otherwise have the same characteristics and accessories as the full hexagon plugs and the same reference numerals are applied to corresponding parts.

The plugs may be made in any suitable size, a convenient width being 5¼ inches taken between parallel facets at the truncation end and 5⅝ inches at the base of the pyramidal form, affording a suitably small angle of taper. The axial length of a plug may be somewhat more than 2 inches, 3 inches, 4 inches or in some cases 6 inches, or other suitable chosen dimensions, according to the thickness of the units to be molded. It will be appreciated that if a universal plug is to be provided for molding panels of different thicknesses, a certain limitation will exist owing to the fact that if very long plugs are used the cell walling at its base will have to be thicker than is desirable to ensure an adequate thickness of plaster at the outer end or rim of the cell walling.

The plugs shown in Figures 3–9 are suitable for molding panels from, say, 2 inches up to about 4 inches thick (including the facings) and are provided with groovings 5a—5d for the particular axial extent of the cell walling to be molded for the panels of the different thicknesses.

In order to provide a standard plug (see Figure 8) capable of molding a panel from 2 inches to about 6 inches thick, the degree of the taper of the frustum is decreased in order that in molding the cell wallings of greater axial extent, the thickness of the said walling at its base or root shall not be too thick, with the plugs spaced in relation to one another to mold the rims of the cells of sufficient thicknesses to be of adequate strength.

Furthermore, it will be appreciated that when molding the cell walling with keying for a 2-inch thick panel the modinlg of keys in the form of ribs on said walling may cause the truncation corner or lower part of the plug to foul or mar the ribbing in the withdrawal of the plugs from the plaster.

In order to obviate any trouble of the above kind, a modification of the keying form is made: each plug is grooved as at 5b, 5c, 5d for the thick panels respectively; the plugs are molded with ribs 5a, 5f for molding 2-inch and 2¾-inch thick panels and preferably with ribs 5g and 5h for panels 3 inches and 3¾ inches thick. These ribs on the plug produce counterpart keying grooves (instead of ribs) on the cell walling when molded and hence are sunk in relation to the plug surface and out of the path thereof during the withdrawal of the more steeply tapered plug when the facets are contracted by the reduced air pressure.

The plugs are disposed in spaced relation to one another such as to leave an adequate clearance between the exterior periphery thereof at their bases when in the molding position for molding the rims of the cell walling of suitable thickness. The taper form of each plug causes the walling of each cell to be molded of corresponding taper decreasing in thickness towards the outer end or rim of the cells of the element formed in the first molding operation, resulting in one facing and open-ended cells.

The appropriate number of plugs A, $A^1$, $A^2$ for molding a panel are assembled and mounted on a plate or in a spider or framework B comprising stout bars 9 (Figures 11, 12 and 13) disposed transversely of the length of the panel to be molded, welded to longitudinal angle bars 10 and 10a. The plugs A are hung from the bars 9 and the plugs $A^1$ from short extensions 9a welded to the bars 9. The longitudinals 10 also support vertically depending members, such as channels 11, carrying hinged guide members 12 adapted to serve for registering with the sides or flaps of a first mold table. Similar vertical channels 11 are mounted at the ends of the framework and each vertical channel (see Figure 12) also serves as a mounting for an adjustable foot 11a which acts as a stop bearing upon a ledge on the sides of the mold table (described below) to limit the depth to which the plugs are immersed in the plaster according to the thickness of panel being molded. This foot is vertically slidable in the channel and is secured by a bolted connection 11b affording facility for vertical adjustment.

The guide members comprise a pair of depending plates 12 pivoted at 12a (see Figure 13) and having a pair of transverse rollers 12b for engaging the outer portion of the adjacent flaps of the mold table. A pair of bell-crank levers 15 pivoted at 15a and terminating in cam noses 15b are connected together by bars 15c. In the position shown in the drawing the cams 15b thrust the rollers 12b into the engaging position while when the levers are turned downward through 90°, the plates 12 are free to move away from the engaging position. The side and end vertical channels 11 themselves may be adjustably bolted in position and in the latter case the bolts pass through a packing block 11c.

The framework end members, such as angle irons 13, are connected to the ends of the longitudinals 10, and the irons 13 are coupled to small subsidiary frames 14 for convenience in mounting the fragmentary plugs $A^2$ or for making up panels of a different length. The longitudinal members 10 are connectible to lifting mechanism or hoists (not shown) by hooks which are attached through holes 10b, for raising and allowing the plug framework to be lowered for immersion of the plugs in the plaster of the mold table. The vertically controlling mechanism or hoists for the plug framework may be mounted on carriages traversable on rails for displacing the framework and plugs as a whole horizontally in mutually perpendicular or other directions for the purpose of positioning the plugs over the mold table (or successive mold tables) and mechanism may be included for inverting the first mold table and the molded plaster preparatory to the second molding operation.

The plugs are connected together pneumatically in any suitable manner to afford the equal and simultaneous distribution of the air pressure effects which are applied through a header pipe 16 which extends longitudinally over the flange of the central angle iron 10a to which the header is attached at intervals by clips 17. The header is alternatively connectible by suitable three-way valve means to a source of compressed air and a source of evacuation (not shown in the drawings). The tubular rods 8 of the plugs have connected to them flexible pipes 18 of rubber or the like which connect a rod 8 of one plug with a rod 8 of an adjacent plug. For convenience in distributing the pneumatic pressure the plugs may be served in groups by flexible connections 18a from the header 16. In the plan view in Figure 11 the arrows at the right-hand side of the figure indicate a suitable intercommunicating grouping which includes some of the full hexagonal and fragmentary hexagonal plugs A, $A^1$, $A^2$.

The mold table (see Figures 13, 14, 15, 16) for the first molding operation to form the cell walling in one with a facing and marginal walls or edges for a panel, comprises a bottom plate 19 of suitable rigidity or made rigid by the addition of reinforcement, or the bottom plate 19 may be of composite form comprising a pair of plates united by webs 19a as seen in Figure 13. The side and end margins of this plate or table have hingedly secured thereto flaps 20, 20a, the hinged arrangement being convenient for displacing them outwardly to release the unit at the appropriate stage in the formation thereof. The form of the hinges adjacent the pivotal axis affords stop means to limit the outward and inward hinging movement of the flaps, stops for the inward position being adapted to ensure the vertical disposal of the flaps in the molding position. Each flap is formed with a projecting ledge 20b which serves as an abutment for contact with the feet 11a of the vertical side and end channels 11 on the plug assembly framework B (see, for example, Figure 13). The mating corners of the flaps may be mitred and rebated to secure a plaster-tight joint and the flaps at their corners are secured by tightening clamps or clips 21 of any suitable kind.

The inward sides of the flaps are provided with broad ribs or like forms 20c extending horizontally for molding grooves in the outer edges or margins of the panel unit and this ribbing may be contoured to mold a channel extending into a deeper channel in the central zone of said edges. This ribbing and the corresponding molded channels are for the purpose of forming elongated continuous cavities when molded units are placed edge to edge for building purposes, in order that plaster or cement grouting may be poured into the cavities formed by the mated vertical channels.

The ribbing or internal surface of the side flaps of the first facing-mold may be made interchangeable, or side flaps themselves may be interchangeable for molding different thicknesses of panel or changing the peripheral configuration of the edges of such element or unit. According to one mode of providing for interchangeability the hinge formation may be such that the hinging knuckles may be readily detached or the hinge pin withdrawn. Alternatively separate mold tables may be made for the different thicknesses of panels to be molded or for the different forms of contour required for the margins or edges of the panels. The exterior of the flaps 20 is formed with a longitudinal shoulder 20d which acts as a stop when lowering the mold table C in the second molding operation.

Holes 22 are formed in the end flaps 20 for allowing the escape of air from the cells during the second molding operation. During the first molding operation these holes are stopped with suitable extractable pins.

The mold D for the second facing employed in the second molding operation is similar to the first mold table C described with the exception that the side and end flaps 23 (see Figures 15 and 16) hinged to the bottom plate 19 have plain interior and exterior surfaces and are designed to lie outside the flaps 20 of the first mold table in the second molding operation, the arrangement being such that the outer part of the flaps 20 slide vertically against the inner face of the flaps 23. The vertical height of the flaps 23 will depend upon the thickness of the panel to be molded and will agree with the dimensions of the flaps 20 of the first mold table. The upper edge of the flaps 23 operate as abutments for engaging the stop shoulders 20d of the flaps 20 of the first mold table to determine the downward position when lowering it upon the second mold table.

The plate surface area of both or either mold tables may be plain or formed with ornamental relief or intaglio forms or with supplemental ribbing or grooving in order to form on the outside of one or both faces keying elements to which a Portland cement or quick-setting cement or composition of harder or different characteristics from that of the plaster may be molded in order to render the units suitable for the outer walls of buildings or for other purposes.

During the molding operations high frequency or other vibrations may be imparted to the first mold table or to both tables or to the plug supporting framework B, and it is preferred to employ a rectilinear vibration or one confined to a plane parallel to the facing.

In molding a panel the process of molding the cell walling b (Figure 1) in conjunction with the first facing a is as follows:

The plugs, A, $A^1$, $A^2$ assembled and secured in the framework B (Figures 11, 12, 13) are moved into the correct vertical position over mold table C for the first molding operation. When once the plugs have been mounted in the framework at the correct vertical height for a unit of predetermined dimensions they remain fixed but in order to accommodate any irregularities in the flow or displacement of the plaster owing to differences in the molding action of the plugs, certain of the plugs may be readjusted to accommodate such variations.

The facing mold table C with the marginal flaps 20 in position is charged with plaster which is sufficiently liquid to enable it to rise in the clearances between the plugs when they are immersed in the plaster, the quantity of plaster being predetermined such that the plaster will rise to the edge of the flaps.

Compressed air is admitted to all the plugs under sufficient pressure laterally to support the facets of the plugs against the pressure of the plaster and cause the truncation surface 2 thereof to become slightly outwardly dished or convex.

The plug framework B is then lowered, being guided by the rollered plates 12 which are locked by depressing the cam levers 15, until the truncation surface of the plugs touches the plaster level, after which the plugs are allowed to sink into the plaster under gravity action (or under applied pressure) while vibration is applied to the mold to facilitate the flow and displacement of the plaster and to avoid the occlusion of air. Instead of initially introducing compressed air, it may be admitted as the plugs are about to or after they contact the plaster. The plugs sink by gravity action into the plaster until the feet 11a of the vertical channels 11 rest under the ledges 20b of the mold flaps 20 and further downward movement is arrested.

Figures 11, 12:
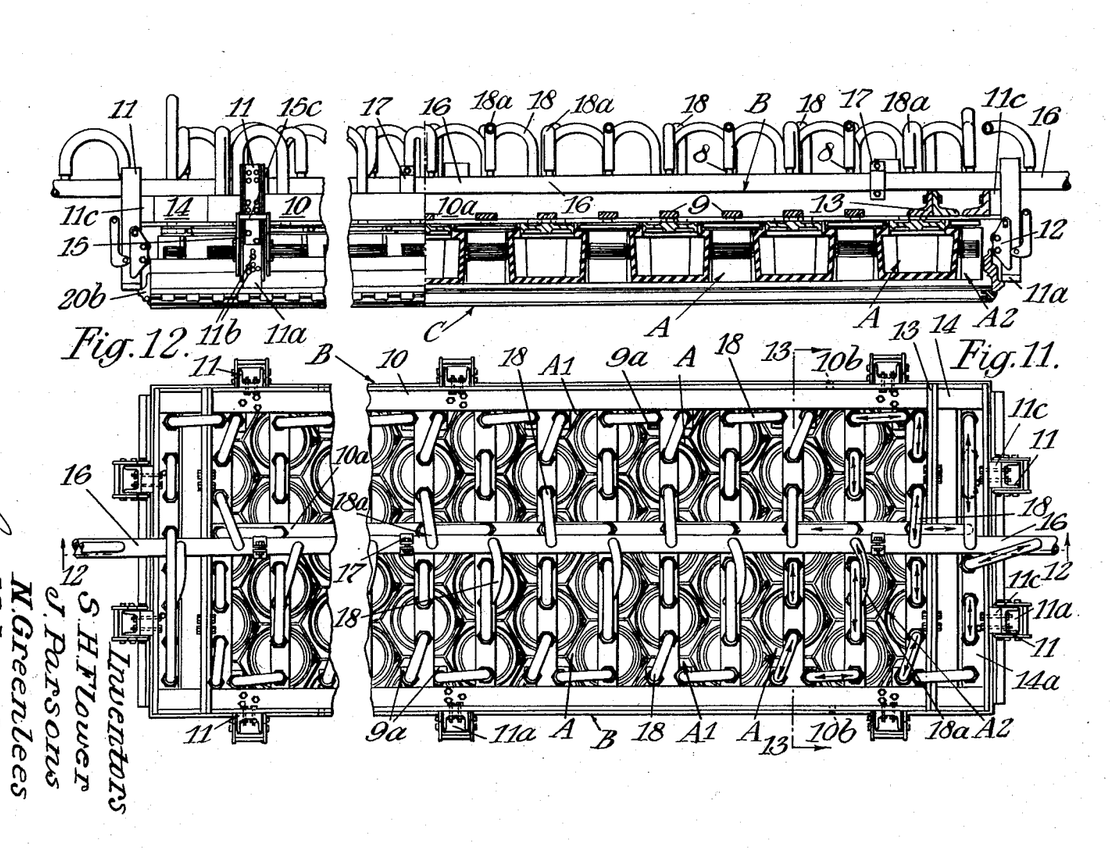
Figure 11 is a plan view of an assembly of plugs in a framework unit for molding a facing and cell-forming walling for a panel, simultaneously and in one with one another.
Figure 12 is a view of the plug assemblage and framework in which a portion at the left-hand side of the drawing is shown in outside elevation and the remainder is shown in longitudinal section of Figure 11. In this figure the plugs are shown in position in a mold table for molding the first facing and cell walls but without the molded plaster.

In Figure 12 the mold table C is appropriate for molding a panel of a thickness involving the second series of grooving on the plugs counting upwardly from the truncation surface while in Figure 13 the mold table C is appropriate for a panel of a thickness involving all the grooving on the plugs (as for a panel about 4 inches thick).

The vertical wedge-shaped projections 7 on the plugs will mold the notches or slots f (see Figure 2) in the cell walls so that there is free communication between one cell cavity and another to prevent trapping of air in the second molding operation described below. While this molding is taking place, horizontal pins are in position in the holes in the end flaps 20 of the facing-mold C and upon withdrawal of these pins after the plaster has set, corresponding air passages will be formed for communication with atmosphere, which will enable air to escape from all the intercommunicating cell cavities during said second molding operation.

A period is then allowed for the plaster to set, after which the compressed air is released, enabling the convex truncation surfaces of the plugs to retract or tend to retract to their normal position. Upon the escape of compressed air, connection is made with the evacuating source and the air pressure within the cells is reduced to about 6 inches mercury pressure for example, that is to say to an extent which will render the facets of the plugs to be drawn inwards and assume a concave form, thereby releasing the molding contact of the facets with the plaster and allowing the plugs to be withdrawn by lifting the framework B, such withdrawal taking place clear of the ribbing formed on the internal surface of the plaster walling defining the cell cavities.

Figure 15:
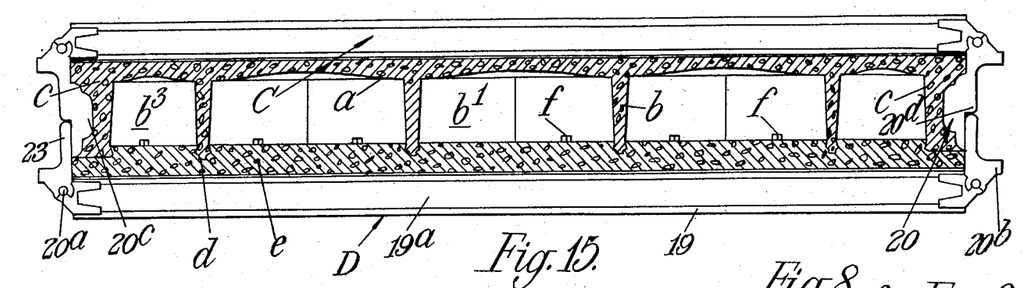

This leaves the molded plaster in position in the first mold table C ready for the second molding operation (see Figures 15 and 16).

Assuming the hinged walls of the second mold D to have been erected and its mold plate 19 charged with sufficient plaster to form the second facing e of chosen thickness, the plaster element first molded, together with the first facing-mold C, still in position around it is inverted and registered over the second table D so that the flaps 20 may be slid down inside the flaps 23. The pins sealing the holes 22 in the end flaps of the table C are removed and it, together with the plaster molding, is lowered (by machinery or by hand) until the cell walling rims contact with and enter the charged plaster. The element is allowed to settle under gravity (or pressure) aided by vibration, to the predetermined position whereat it is arrested by the contact of stop shoulder 20d with the top edge of the flaps 23. This position is calculated so that the plaster of the facing rises sufficiently to envelop at least one of the key-forming ribbings d of the cell walling (as shown in the two examples illustrated in Figures 15 and 16) so that not only is the plaster of the second facing adhesively united with the plaster of the first element but is mechanically keyed thereto by the embedding of the ribbing formation. The intercommunication of the cells through the apertures f (Figures 1 and 2) and the escape or vent holes 22 (Figure 11) prevent air being entrapped in the cell and so obstructing the embedding of the cell rim in the second facing plaster. The apertures f and holes 22 may also be utilised as a means for circulating drying air through the structure during or after molding.

After the plaster has set, the walling flaps 20 of both mold tables are released at the clips 21 and hinged outwardly, the first facing-mold C is lifted off and the completed unit detached from the plate surface of the second mold D.

In the above described mode of carrying the invention into effect, full hexagon plugs have been described for the main cells and the use of half or fractional cells for the marginal or corner portions. It is to be understood that all the cells may, if desired, be molded in half hexagonal (or other fractional) forms by the use of plugs of corresponding shape, each half plug having its diagonal (or radial) facet spaced from the complementary plugs such that the unit is provided with rectilinear aligned cell walls arranged either lengthwise or transversely of the unit or with the cell walls disposed according to a predetermined pattern.

The plaster employed for either or both molding operations may be used plain or reinforced or mingled with vegetable or mineral fibres of a length such as will not interfere with the flow of the plaster and, if desired, foamed plaster may be employed for the cell walling and either or both facings; also for certain purposes it may be suitable to charge the cells when formed with foamed plaster, instead of leaving them hollow.

In order to make the second facing of concrete the rims of the cells after the first molding operation may be dipped in a mastic, bitumen or suitable coating composition adjacent the keying grooves, and have molded onto these edges a facing of concrete or other molding composition, adapting the unit to present a surface suitable for exterior use or for special purposes from which damp will not seep through to the inner facing.

According to a modification the second facing may be molded of a plaster or cement combined with a bitumen emulsion or other waterproofing composition so that the facing as a whole is impervious to water. Furthermore, reinforcement for the facings may be provided in the form of embedded wires or net by laying such in the first facing plaster in the appropriate position, and for the second facing the wires or net may be extended below and across the edges of the cells and forced down into the plaster during the second molding operation. Similarly open mesh vegetable fabric or fibers may be introduced into the facings as reinforcement.

We claim:

1. A prefabricated gypsum plaster panel member for building purposes, comprising a continuous facing sheet of gypsum plaster forming one side of the panel, laterally interconnected gypsum plaster walls extending outwards from one side of said sheet, said walls being both integral and homogeneous with the plaster of the facing sheet and defining a group of separate cells having their central longitudinal axes at right angles to said sheet and terminating in end surfaces on a substantially common level in a plane parallel to the sheet, the inner surfaces of the walls of the cells having deformations therein defining at least one pair of surfaces that extend transversely of the axes of the respective cells and which lie on substantially common levels inward of said ends, said transversely extending surfaces having a substantial extent in a direction around the interior of each cell in relation to the perimetrical extent of each cell, and a second continuous gypsum plaster facing sheet at the other side of the panel, covering the ends of all the cells and having a thickness to extend inwardly of each cell toward the first mentioned facing sheet a distance to extend beyond said transversely extending surfaces so that the second facing sheet is both integrally bonded to and mechanically interconnected with said walls.

2. A prefabricated gypsum plaster panel member for building purposes, comprising a continuous facing sheet of gypsum plaster forming one side of the panel, laterally interconnected gypsum plaster walls extending outwards from one side of said sheet and of diminishing taper in cross section, said walls being both integral and homogeneous with the plaster of the facing sheet and defining a group of separate cells having their central longitudinal axes at right angles to said sheet and terminating in end surfaces on a substantially common level in a plane parallel to the sheet, the inner surfaces of the walls of the cells having deformations therein defining at least one pair of surfaces that extend transversely of the axes of the respective cells and which lie on substantially common levels inward of said ends, said transversely extending surfaces having a substantial extent in a direction around the interior of each cell in relation to the perimetrical extent of each cell, and a second continuous gypsum plaster facing sheet at the other side of the panel, covering the ends of all the cells and having a thickness to extend inwardly of each cell toward the first mentioned facing sheet a distance to extend beyond said transversely extending surfaces so that the second facing sheet is both integrally bonded to and mechanically interconnected with said walls.

3. A prefabricated gypsum plaster panel member for building purposes, comprising a continuous facing sheet of gypsum plaster forming one side of the panel, laterally interconnected gypsum plaster walls extending outwards from one side of said sheet and of diminishing taper in cross section, said walls being both integral and homogeneous with the plaster of the facing sheet and defining a group of separate cells of truncated steep pyramidal shape and having their central longitudinal axes at right angles to said sheet and terminating in end surfaces on a substantially common level in a plane parallel to the sheet, the inner surfaces of the walls of the cells having deformations therein defining at least one pair of surfaces that extend transversely of the axes of the respective cells and which lie on substantially common levels inward of said ends, said transversely extending surfaces having a substantial extent in a direction around the interior of each cell, but terminating short of the corners defining each side of each said pyramidal shaped cell, and a second continuous gypsum plaster facing sheet at the other side of the panel, covering the ends of all the cells and having a thickness to extend inwardly of each cell toward the first mentioned facing sheet a distance to extend beyond said transversely extending surfaces so that the second facing sheet is both integrally bonded to and mechanically interconnected with said walls.

4. A panel as claimed in claim 3 wherein the panel is rectangular in front and rear elevation and the walls defining certain of the cells at the edge margins of the panel define both fragmentary and whole cells, and including top, bottom and side edge marginal rectilinear walls surrounding the panel and integral and homogeneous with the said first facing and bounding said fragmentary and whole cells, said transversely extending surfaces being also on the inner surface of said marginal walls that bound said fragmentary and whole cells and lying parallel with the edges thereof, and the said marginal walls being embedded in the thickness of the said second facing plaster to an extent to submerge the said last-mentioned transversely extending surfaces of said marginal walls.

5. A panel as claimed in claim 2 wherein the said walls define polygonal cells and the transversely extending surfaces on the interior walls of the polygonal cells terminate short of the corners of said cells.

6. A panel as claimed in claim 3, wherein the walls have at least one notch therethrough and extending axially thereof in such selected number of sides of said cells as to provide atmospheric intercommunication between said cells.

References Cited in the file of this patent

UNITED STATES PATENTS

| | | |
|---|---|---|
| 767,494 | Noble | Aug. 16, 1904 |
| 1,079,112 | Conzelman | Nov. 18, 1913 |
| 1,280,530 | Parker | Oct. 1, 1918 |
| 1,406,989 | Lichtenberg et al. | Feb. 21, 1922 |
| 1,462,663 | Schall | July 24, 1923 |
| 1,562,706 | Lake | Nov. 24, 1925 |
| 1,715,920 | Henry | June 4, 1929 |
| 2,052,818 | Freyssinet et al. | Sept. 1, 1936 |
| 2,170,188 | Cobi | Aug. 22, 1939 |
| 2,192,183 | Deutsch | Mar. 5, 1940 |
| 2,443,961 | Pelatowski | June 22, 1948 |
| 2,498,513 | Cuypers | Feb. 21, 1950 |

FOREIGN PATENTS

| | | |
|---|---|---|
| 259,706 | Great Britain | of 1926 |
| 613,911 | Great Britain | of 1948 |